2,947,604
PRODUCTION OF ALUMINA

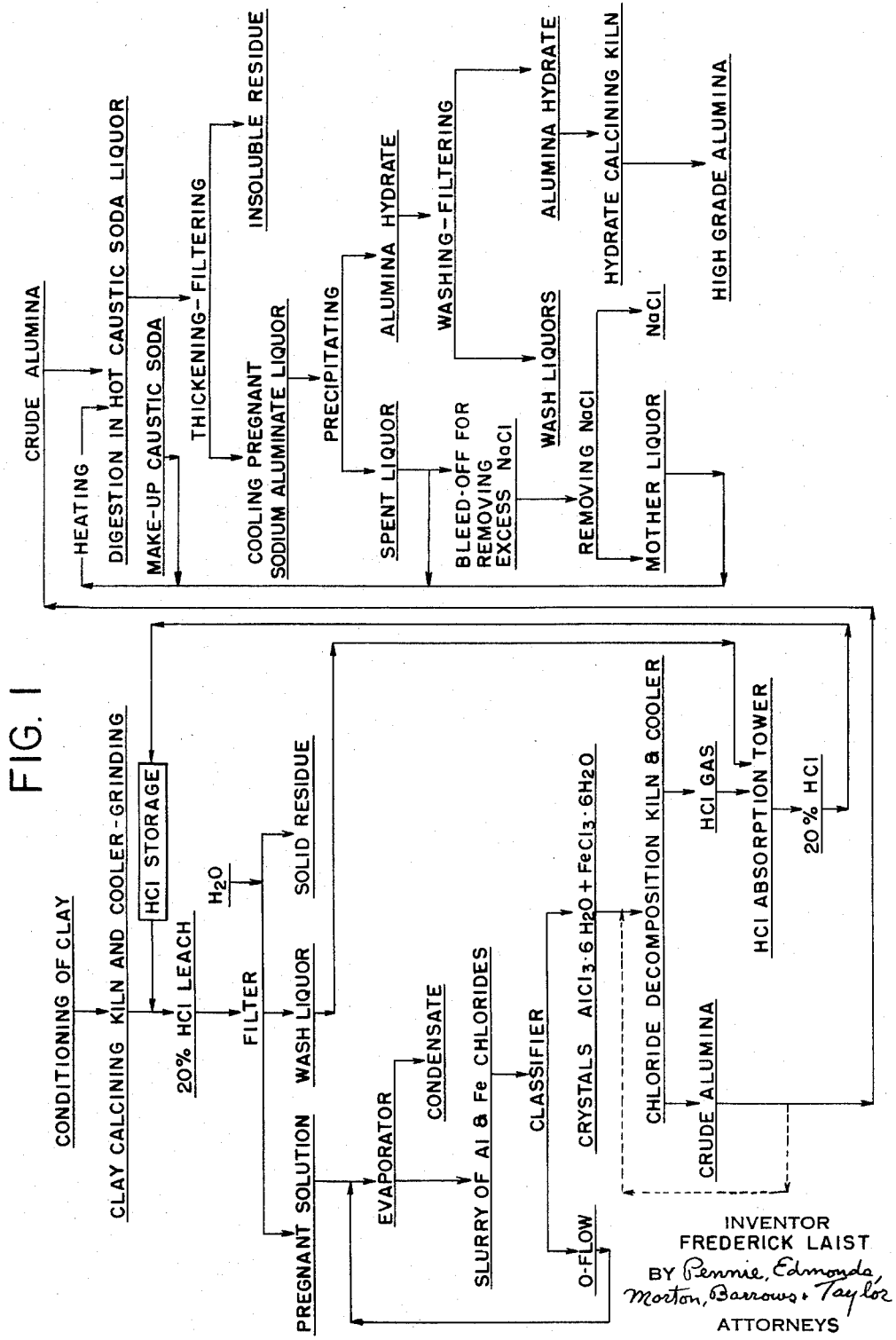
Aug. 2, 1960 — F. LAIST — 2,947,604
PRODUCTION OF ALUMINA
Filed Dec. 7, 1956 — 2 Sheets-Sheet 1
FIG. I
INVENTOR
FREDERICK LAIST
BY Pennie, Edmonds,
Morton, Barrows & Taylor
ATTORNEYS

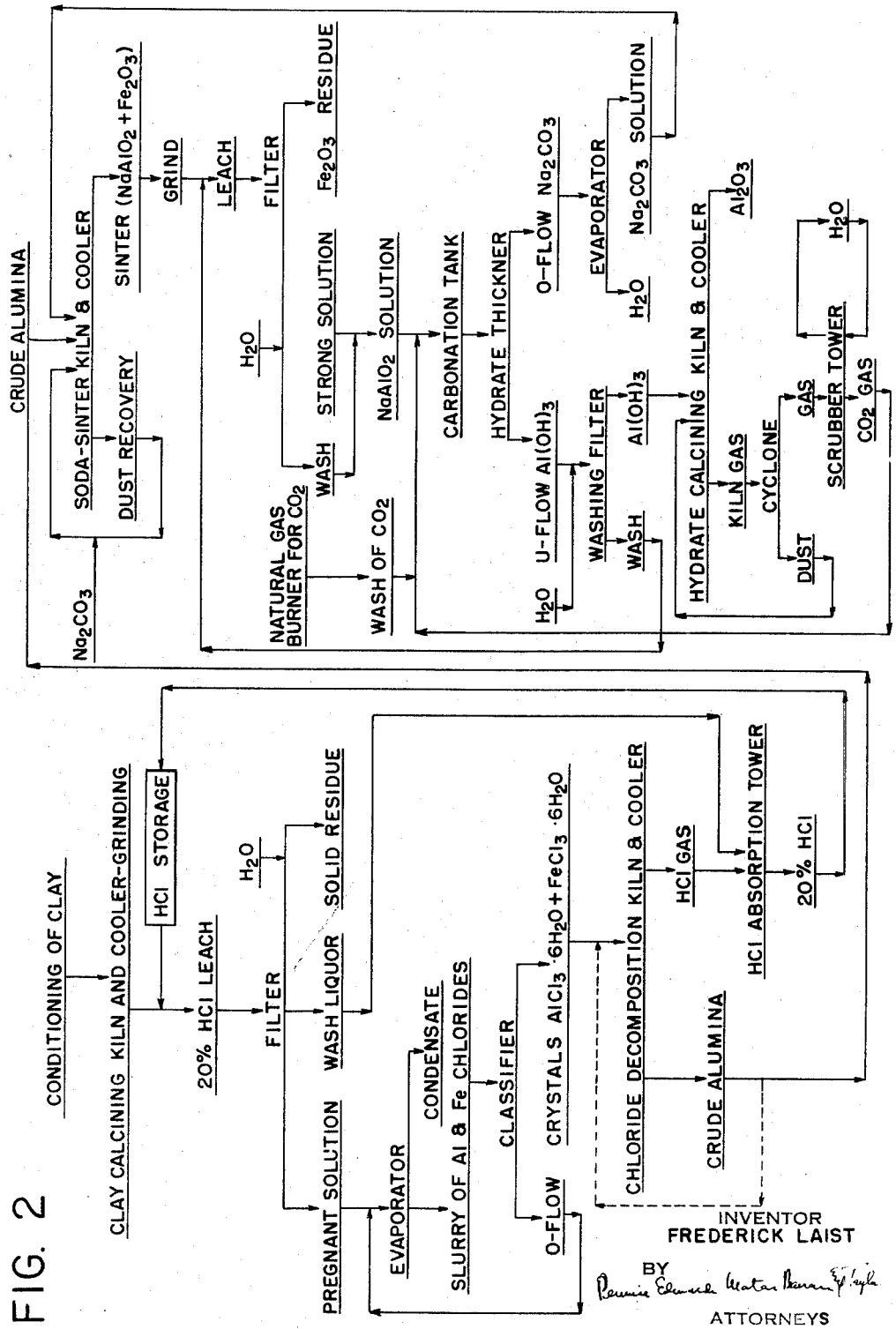

Frederick Laist, Los Angeles, Calif., assignor to The Anaconda Company, New York, N.Y., a corporation of Montana Filed Dec. 7, 1956, Ser. No. 626,916

4 Claims. (Cl. 23—143)

This invention relates to the production of alumina from clays. More particularly the invention is concerned with the production from an iron-containing clay of a high grade, substantially silica- and iron-free alumina suitable as feed in the electrolytic aluminum reduction process.

Bauxite, the principal ore of alumina (aluminum oxide—$Al_2O_3$), has heretofore been, and is presently, the main source of alumina as feed in the electrolytic production of aluminum. Clay has long been recognized as another possible source of high grade alumina, and various proposals have heretofore been advanced for producing such alumina from clays. In clay, alumina is combined with silica ($SiO_2$), generally in the form of a hydrous silicate of alumina (e.g. $Al_2O_3 \cdot 2SiO_2 \cdot 2H_2O$). Clays further contain varying amounts of other constituents, frequently referred to as impurities, such as excess silica, iron compounds, e.g. ferric oxide ($Fe_2O_3$), etc. The present invention contemplates an improved method of producing a high grade alumina product subtantially free of silica and iron, from clays containing varying amounts of silica and iron.

The method of the invention involves two stages of treatment in the first of which silica is removed from the clay and a crude alumina containing ferric oxide is produced, and in the second of which the ferric oxide is eliminated and a high grade alumina product is produced. Basically, the first stage treatment involves calcining the clay at an elevated temperature to render the alumina and iron soluble in hydrochloric acid (HCl). The calcined clay is leached with an aqueous solution of hydrochloric acid, preferably of a concentration of about 20% HCl, to solubilize the aluminum and iron compounds as chlorides in an aqueous solution leaving practically all of the silica in the insoluble leach residue. Following filtration, or other suitable solids-liquid separatory step, the solution of aluminum and iron chlorides is concentrated by evaporation to produce a crystal slurry or magma of aluminum and iron chlorides

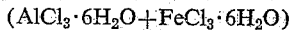

$(AlCl_3 \cdot 6H_2O + FeCl_3 \cdot 6H_2O)$

This crystal slurry, after suitable conditioning if necessary or desired, is calcined at an elevated temperature in the course of which the chlorides are decomposed into oxides with the evolution of hydrogen chloride (hydrochloric acid gas) which is recovered for reuse in the treatment of further calcined clay. The calcine is a substantially silica-free crude alumina product containing iron oxide usually analyzing about 85% (plus or minus 5%) $Al_2O_3$ and 15% (plus or minus 5%) $Fe_2O_3$, depending on the quality of the clay feed, and constitutes the feed of the second stage treatment.

The purpose of the hydrochloric acid extraction, or first stage, treatment is to produce a crude alumina product, free of silica, for a succeeding purification, or second stage, treatment. Metallurgically the alumina and iron oxide in the calcined clay are soluble in 20% hydrochloric acid, while silica is insoluble. The chlorides of aluminum and iron (after separation from the silica residue and suitable dehydration) are amenable to decomposition by thermal treatment to yield hydrogen chloride gas and a crude alumina product substantially free of silica but contaminated with iron oxide in proportion to its occurrence in the clay. The purpose of the purification, or second stage, treatment is to remove the contaminating iron oxide from the crude alumina. Because the crude alumina is substantially free of silica, it is admirably amenable to either of two purification treatments for eliminating the iron oxide, which treatments are hereinafter referred to as the caustic soda digestion treatment and the soda-sinter treatment. While a minor amount of silica can be tolerated in the caustic soda digestion treatment, its presence is undesirable since it leads to loss of alumina. In the soda-sinter treatment, the crude alumina should be substantially free of silica because silica would be solubilized and might thus contaminate tthe desired high grade alumina product. The choice of purification treatment depends to some extent upon the iron content of the clay, the caustic soda digestion treatment being generally more advantageous where the rion content of the clay is relatively low, say not exceeding about 6% (calculated as $Fe_2O_3$), while the soda-sinter treatment is generally more advantageous where the iron content of the clay is relatively high.

In each purification treatment the primary objective is to solubilize the alumina content of the crude product as an aqueous solution of sodium aluminate ($NaAlO_2$) without substantially altering the water-insoluble property of the iron oxide in the crude product. The insoluble iron oxide residue is separated from the sodium aluminate solution. The solution is appropriately treated to precipitate aluminum hydroxide ($Al(OH)_3$), and the precipitate is calcined to produce substantially silica- and iron-free alumina suitable as feed to the pot line of an electrictrolytic aluminum reduction plant.

When the purification treatment involves caustic soda digestion, the thermal treatment of the slurry of aluminum and iron chlorides is carried out ot a temperature within the range of 1000 and 1300° F., and while the resulting crude alumina consists principally of the oxides of aluminum and iron (e.g. in the relative proportions of 3–6 to 1), it may, and usually does, contain a minor amount of undecomposed chloride, probably as ferric chloride. The crude alumina is digested in an aqueous caustic soda (NaOH) liquor at elevated temperature and pressure, in the course of which sodium aluminate is formed in solution while the iron is retained in the insoluble residue mainly as ferric oxide. The sodium aluminate solution is separated from the insoluble residue, the solution is appropriately treated to precipitate aluminum hydroxide, and the precipitate is calcined to produce substantially silica- and iron-free alumina.

When the purification treatment involves soda-sintering, the thermal treatment of the slurry of aluminum and iron chlorides is carried out at a temperature within the range of 1500 and 1900° F., and the resulting crude alumina is for all practical purposes free of chlorine. In this purification treatment, the crude alumina is sintered in the presence of sodium carbonate or soda ash ($Na_2CO_3$) at a temperature of at least 1500° F. (and preferably 1700–1900° F.), in the course of which the aluminum oxide is converted into water-soluble sodium aluminate while the iron is retained in the resulting calcine as insoluble ferric oxide. For convenience this operation is herein designated the soda-sinter step. The sinter is leached to dissolve the sodium aluminate and the resulting pregnant solution is separated from the insoluble leach residue consisting mainly of ferric oxide. The solution of sodium aluminate is preferably treated with carbon dioxide gas in the caurse of which aluminum hydroxide is precipitated and sodium carbonate is regenerated for reuse in the soda-sinter step. The precipitated aluminum hydroxide, after washing if necessary or desired, is dehydrated by calcination at and elevated temperature to produce a high grade, substantially silica- and iron-free alumina.

The invention will be better understood from the following description taken in conjunction with the accompanying drawings, in which Fig. 1 is a diagrammatic flow sheet of the main features of the method of the invention in which the crude alumina product is purified by the caustic soda digestion treatment, and Fig. 2 is a similar flow sheet of the method in which the crude alumina product is purified by the soda-sinter treatment.

The raw or green clay is prepared for calcination in appropriate steps of sizing and conditioning. Thus, the clay may be first reduced to lumps of about ¾ inch in size, in a plurality of stages of size reduction. The sized material is advantageously conditioned in a pug mill, and then passed through a cutter or shredder. The thus-conditioned clay is dried and calcined in any suitable type of kiln, preferably at a temperature of about 1200° F. with a retention period of about 1½ hours at that temperature. If the clay is sticky, a certain proportion of dried or calcined clay may be mixed therewith and circulated through the drying and calcining kiln. Dust from the calcining kiln may be collected and returned to the conditioning step following sizing, and a product cooler may be operatively associated with the kiln. The calcined clay is ground to a nominal particle size of about 65 mesh Tyler Screen Series, advantageously in a 2-stage open circuit ball mill.

The ground calcined clay is leached with hydrochloric acid at a concentration of about 20% HCl. Leaching is advantageously carried out at a temperature of at least 160° F., and preferably as near the boiling temperature as practical, with mechanical agitation of the slurry for about one hour. Calcination breaks up the aluminum silicate of the clay into alumina and silica, and the alumina is dissolved by the hydrochloric acid in the leaching step. Leaching also dissolves the iron in the clay, so that leaching produces a solution of aluminum and iron chlorides and a solid residue consisting largely of silica. The solution of chlorides is separated from the solid residue in any suitable type of solids-liquid separator, such as a wet cyclone or filter or a combination thereof, to produce a clarified pregnant solution of aluminum chloride and iron chloride, filter wash liquor and the washed solid residue; the wash liquor being delivered to the HCl absorption tower and the solid residue discharged to waste.

The pregnant solution of aluminum chloride and iron chloride is evaporated in any suitable manner, as for example by vacuum evaporation or the like, to produce a mixed crystal slurry or magma and an aqueous condensate. When, as usual, the crystal slurry contains free hydrochloric acid, the aqueous condensate from the evaporator will contain sufficient hydrochloric acid to warrant its recovery and return to the process, e.g. as filter wash liquor or (if sufficiently concentrated) as aqueous absorbing medium in the HCl absorption tower.

The mixed crystal slurry (usually around 25–30% solids) from the evaporator is treated in a classifier (e.g. bowl classifier) with the overflow thereof being returned to the evaporator. The drained crude crystals (usually around 50–60% solids) may advantageously be conditioned in a pug mill preparatory to delivery to the chloride decomposition kiln, as for example in a pug mill type kiln feeder. The kiln is provided with a product cooler, dust collector and means for returning to the kiln dust and (if desired) a certain proportion of the calcined product. In this kiln, the mixed aluminum and iron chloride crystals are dried and calcined. Since, in the flow sheet of Fig. 1, purification is to be by the caustic soda digestion treatment, calcination is carried out at the lower elevated temperature range of 1000 and 1300° F., and preferably at a temperature of about 1200° F., for about 1 hour, in the course of which the chlorides are decomposed (for the most part) into aluminum and iron oxides and hydrogen chloride gas. The calcined product of this heat-treatment constitutes the crude alumina which is to be purified, in this instance, by the caustic soda digestion treatment. The gaseous product of the chloride decomposition kiln is preferably passed through suitable dust recovery equipment; the dust being returned to the kiln and the dust-free gas delivered to the HCl absorption tower. In the absorption tower, hydrogen chloride gas is condensed in an aqueous medium such as an aqueous solution of hydrochloric acid. This may advantageously be done by maintaining the acid absorbing medium near its boiling temperature. By operating the HCl absorption tower near the boiling temperature of the acid absorbing medium, steam will pass through and out of the tower to the stack, while most of the hydrogen chloride will be absorbed and recovered, provided the HCl concentration of the effluent acid does not exceed 20%, which is the concentration at which an aqueous solution of hydrochloric acid is stable, that is the HCl concentration of such a solution is unchanged by boiling.

The crude alumina produced in the first stage is ground, say to nominal 100 mesh, and the ground product is digested in an autoclave, or the like, with caustic soda liquor. Digestion may follow conventional practice in the art. Thus, the caustic concentration of the digester feed may vary within the range of 100 to 400 g./l. (grams per liter), and usually is within the range of 100 to 200 and preferably around 150 g./l. An excess of caustic soda above the alumina requirement should be used in digestion, such, for example, as 1.5 to 1.75 weights of caustic per weight of alumina. The digestion temperature may vary within the range of 275 to 400° F., and the pressure within the range of 50 to 225 pounds per square inch. Iron oxide passes unaffected through digestion and is discarded with the insoluble residue. Should there be any silica in the crude alumina, it will form during digestion an insoluble sodium-aluminum-silica complex, which is discarded with the insoluble residue and represents the major alumina and caustic losses, which in the method of the invention are practically negligible because the crude alumina feed is substantially free of silica.

By suitable successive steps of thickening and filtering the insoluble residue is separated from the pregnant sodium aluminate solution, or green liquor as it is called in the industry. The solution is cooled to atmosphere temperature and pressure, and is then treated with hydrated alumina seed crystals, which upsets the metastable system and causes precipitation of hydrated alumina or aluminum hydroxide. The alumina content of the green liquor as discharged from digestion may be around 120% of saturation, and when cooled to atmospheric temperature and pressure supersaturation may amount to around 200%. Precipitation is continued until about 50% of the alumina has been recovered from the green liquor as aluminum hydroxide. The spent mother liquor, together with the required make-up caustic, is heated and returned for digestion of further crude alumina.

After washing and filtering, the aluminum hydroxide precipitate is calcined in any suitable type of kiln preferably provided with a cyclone dust collector, and calcine return means and product cooler, at a temperature within the range of 1700 and 2100° F. and preferably about 1800° F. with a retention period of about one hour at that temperature. The kiln is preferably gas-fired, or may even be oil-fired, rather than coal-fired to avoid ash contamination. The calcine consists of purified alumina, practically silica-free and analyzing (dry weight) 99+%
$Al_2O_3$ and insignificant amounts of $Fe_2O_3$ and $Na_2O$.

Optimum operating results are obtained by observing the aforementioned preferred temperature ranges of the various calcining operations. Thus, clay calcined at temperatures below 1000° F. does not give good extraction of alumina in 20% hydrochloric acid. On the other hand, at calcining temperatures of 1500° F. and higher, alumina and silica fuse and form a fixation compound insoluble in 20% hydrochloric acid. Accordingly, in practicing the invention, it is desirable to avoid these unfavorable temperatures, and hence the clay calcining kiln is preferably operated within the temperature range of 1100 and 1300° F.

The chloride decomposition kiln should, in this instance, be operated within the range of 1000 and 1300° F. If the calcining temperature exceeds about 1300° F., the solubility of alumina in caustic soda is too low for economic operation, while at a calcining temperature below about 1000° F., the decomposition of the chlorides is so imperfect that an objectionable amount of chloride remains in the calcine. This amounts to saying that the solubility of alumina in caustic soda decreases as the temperature of chloride decomposition is increased, while chloride decomposition improves as the calcining temperature is raised. It is due to these considerations that the chloride decomposition kiln is preferably operated at about 1200° F. With a detention period of about 1 hour at that temperature, at least 99% of the chlorides are decomposed with evolution of the chlorine as hydrogen chloride.

If the temperature of calcination of the aluminum hydrate is too low, that is lower than 1600° F., the calcined alumina is hygroscopic. Optimum results are obtained within the temperature range of 1700 and 2100° F. Calcining temperatures near the higher end of the range, and even above 2100° F., make possible desirable particle size control.

Since the decomposition of the aluminum and iron chlorides can rarely, if ever, be complete at the optimum calcining temperature, the crude alumina will contain a minor amount of undecomposed chloride, probably in the form of ferric chloride. During digestion, the ferric chloride will react with caustic soda to form insoluble iron hydroxide ($Fe(OH)_3$) and soluble sodium chloride. The iron hydroxide will be discarded with the insoluble residue, but the sodium chloride will be dissolved in the sodium aluminate solution, and as spent green liquor is repeatedly recycled sodium chloride will build up in the caustic soda digestion liquor. In the event that the chloride decomposition kiln is operated near the lower end of its aforementioned temperature range, in order to increase the solubility of alumina in caustic soda, the accumulation of sodium chloride in the recycled digestion liquor may impair the liquor's effectiveness and it hence will become necessary to remove excess sodium chloride from the recycling caustic soda liquor.

When the concentration of sodium chloride in the spent caustic soda liquor exceeds a predetermined maximum, some of the liquor is bled off and sodium chloride is removed therefrom, and the liquor, freed of sodium chloride to a desired extent, is returned to the recycling caustic soda liquor. Removal of sodium chloride may be by evaporation and crystallization of the spent caustic soda liquor bled off from time to time.

Since make-up hydrochloric acid must be provided in the acid extraction stage, it would be advantageous in conjunction with the method of the invention, to do so by electrolysis of sodium chloride and recombining the chlorine and hydrogen given off at the two poles of the electrolytic cell. Caustic soda would be formed in the cell as a byproduct, and would be available to supply the required make-up for the recycling caustic soda liquor. Sodium chloride recovered by evaporation and crystallization of spent caustic soda liquor is used to control the chloride content of the electrolytic cell.

The following example illustrates a practice of the invention, in accordance with the flowsheet of Fig. 1, with an Idaho clay containing (as mined) 25–30% free moisture ($H_2O$), and analyzing (dry weight) about 26% $Al_2O_3$, about 5.7% $Fe_2O_3$, about 54% $SiO_2$; the balance being mainly combined water. The example is purely illustrative and not restrictive of the invention. The dried clay was calcined for 1½ hours at a temperature of 1150° F., with a calcining weight loss of about 12%. The calcined clay analyzed about 30% $Al_2O_3$, about 6.5% $Fe_2O_3$ and the balance mostly $SiO_2$ and was ground to nominal 65 mesh (i.e. 3–5% on and the balance through 65 mesh) with 11% by weight plus 100 mesh and 62% by weight minus 200 mesh.

The calcined clay was leached with mechanical agitation for 1 hour at a temperature of about 210° F. with an aqueous solution of hydrochloric acid of 20% HCl concentration; about 65 parts by weight of 100% HCl being initially present for each 100 parts by weight of calcined clay. After solids-liquid separatory steps of thickening, clarification and filtering, 82% of the $Al_2O_3$ in the calcined clay was recovered in the pregnant solution as $AlCl_3$. By analysis, the pregnant solution contained 75 g./l. (grams per liter) of $Al_2O_3$, 7.8 g./l. Fe and 5.4 g./l. of free HCl. The total loss of hydrochloric acid in the acid extraction treatment was about 2.5%.

The pregnant solution of aluminum and iron chlorides was subjected to vacuum evaporation, followed by washing and draining of the resulting crystal slurry. The crystal slurry as fed to the chloride decomposition kiln analyzed 56% $AlCl_3 \cdot 6H_2O$; 7.5% $FeCl_3 \cdot 6H_2O$, 10% $AlCl_3$, 1.5% $FeCl_3$ and 25% free $H_2O$, being thus about 50% solids. The kiln was maintained at a temperature of about 1200° F. and the detention period of the charge at that temperature was 1 hour. The calcine (crude alumina) analyzed about 84% $Al_2O_3$, about 15% $Fe_2O_3$, less than 1% residual chlorine, and negligible silica. About 97% of the hydrogen chloride in the gaseous product of the chloride decomposition kiln was recovered in the 20% HCl effluent of the HCl absorption tower. The over-all loss of HCl was about 4%, and this amount of make-up acid (as 100% HCl) was included in the 20% HCl leach liquor for the chloridizing leaching of the calcined clay.

The crude alumina, ground to nominal 100 mesh, was digested with caustic soda for about one hour in an autoclave at a temperature of about 300° F. and pressure of about 100 pounds per square inch. The concentration of the caustic soda liquor fed to the digester was about 1.67 weights of NaOH per weight of $Al_2O_3$ in the crude alumina fed to the digester. Digestion, solids-liquid separation and cooling of the pregnant sodium aluminate liquor may, however, be carried out by any of the presently conventional procedures. Alumina hydrate seed crystals were charged into the cooled and supersaturated pregnant green liquor, and about half of the alumina content of the liquor was precipitated as alumina hydrate (aluminum hydroxide). The precipitated alumina hydrate was thickened, washed and calcined at a temperature of 1800° F. to produce the final high grade alumina which was substantially free of silica and iron and admirably adapted as the feed to electrolytic reduction furnaces.

Referring now to the flowsheet of Fig. 2 in which purification of the crude alumina is carried out by the soda-sinter treatment, the acid extraction, or first stage, treatment is essentially the same as hereinbefore described, except that the chloride decomposition kiln is operated at a higher temperature, say at least 1500° F., and preferably within the range of 1700 and 1900° F., in order to minimize the amount of residual chlorine in the crude alumina. At a calcining temperature of 1700°

F., the crude alumina is substantially free of chlorine (e.g. 0.1% or less), so, for optimum results, the chloride decomposition kiln is operated within the aforementioned temperature range. In all other respects, the acid extraction treatment is conducted in the manner hereinbefore described in connection with the flowsheet of Fig. 1.

The crude alumina, ground to nominal 100 mesh is subjected to a sintering heat treatment in the presence of sodium carbonate. The sodium carbonate may advantageously be mixed with the crude alumina in the form of a concentrated aqueous solution recovered from the process as hereinafter described. Make-up sodium carbonate may be added dry to and mixed with the soda-sinter charge. The sintering operation is preferably carried out at a temperature within the range of 1700 and 1900° F. with a retention period of about one hour at that temperature in any appropriate type of kiln, preferably provided with a pug mill type feeder, cyclone dust collector and return, and product cooler.

In the course of sintering substantially all of the alumina is converted to water-soluble sodium aluminate, while the iron remains in the sinter as insoluble ferric oxide. The sintered product is leached, preferably with hot wash water from subsequent clarification operations, to dissolve the sodium aluminate, which is separated from the insoluble sinter residue (largely $Fe_2O_3$) by filtration. If desired, the filtrate may be further clarified in a polishing filter or the like. The clarified sodium aluminate solution is delivered to a carbonation tank for treatment with carbon dioxide gas which may advantageously be obtained from the aluminum hydrate calcining kiln and/or from a natural gas burner or the like.

In the carbonation tank, sodium aluminate reacts with carbon dioxide to form a precipitate of aluminum hydroxide and water-soluble sodium carbonate. The slurry from the tank is delivered to a hydrate thickener (or other suitable solids-liquid separator) from which the aluminum hydroxide is discharged in the underflow and the sodium carbonate in the overflow. By evaporation the sodium carbonate overflow is concentrated to a suitable degree for return to the soda-sinter treatment of crude alumina. The aluminum hydroxide underflow is washed and filtered, and the wash water is utilized in the leaching of soda-sinter product.

The washed aluminum hydroxide is calcined in any suitable type of kiln, preferably provided with a cyclone dust collector and return means and product cooler, at a temperature within the range of 1700 and 2100° F. and preferably about 1800° F. with a retention period of about one hour at that temperature. The kiln is preferably gas-fired, or may even be oil-fired, rather than coal-fired to avoid ash contamination. The calcine consists of purified alumina, practically silica-free and analyzing (dry weight) 99+% $Al_2O_3$ and insignificant amounts of $Fe_2O_3$ and $Na_2O$. Dust from the gaseous product (kiln gas) of the calcining kiln is recovered in a cyclone and may be returned to the kiln, and the carbon dioxide in the residual gas (after passing the gas through a scrubber tower) is utilized in the aforementioned carbonation tank.

The sodium aluminate produced in the soda-sinter kiln has a high degree of water-solubility. The reaction during leaching of the soda-sinter product is strongly exothermic and leaching is preferably carried out at a temperature as near the boiling point as practical and at least above 160° F.

The soda-sinter step should be carried out at a temperature of at least 1600° F. since lower-temperatures do not give good conversion to sodium aluminate. Sintering at a temperature much above 1900° F. gives a more glazed, less granular product of relatively lower water-solubility. Hence, the preferred temperature of the soda-sinter step is within the range of 1700 and 1900° F., within which temperature range the color of the product is a very pale green off-white.

Depending on current and local economics, the sodium compound required for practicing the soda-sinter step may be supplied by sodium hydroxide rather than sodium carbonate as hereinbefore described. If the sodium compound is introduced into the circuit as sodium hydroxide, it will be necessary to carbonate it before inclusion in the soda-sinter charge. This may be done by silica-free carbon dioxide gas recovered from the hydrate calcining kiln, from a gas-fired steam boiler stack of the plant, or the like. As hereinbefore mentioned, both sodium hydroxide and hydrochloric acid may be locally made by electrolysis of sodium chloride as conventionally practiced, and carbon dioxide for carbonating the sodium hydroxide may be supplied as aforesaid.

The following example illustrates a practice of the invention, in accordance with the flowsheet of Fig. 2. The acid extraction treatment was carried out as described in the preceding example, except that the chloride decomposition kiln was maintained at a temperature of 1700–1800° F. and the detention period of the charge at that temperature was 1 hour. The calcine (crude alumina) analyzed about 84% $Al_2O_3$, about 16% $Fe_2O_3$, less than 0.1% residual chloride, and negligible silica.

The crude alumina was ground to nominal 100 mesh, and mixed with recycled sodium carbonate solution and make-up sodium carbonate, in the proportion by weight of about 40% crude alumina, 50% $Na_2CO_3$ in recycled solution and 10% make-up $Na_2CO_3$. This mixture was sintered at a temperature of 1900° F. for 1 hour, in the course of which the alumina was converted to sodium aluminate while iron remained unchanged in the sinter as $Fe_2O_3$. The sinter product analyzed 42.3% $Al_2O_3$, 25.6% $Na_2O$, 23.8% $Na_2CO_3$ (free) and 8.3% Fe, and was ground to nominal 100 mesh. The ground sinter was leached with water (filter wash water) at a temperature of about 210° F. in about one-half hour's time.

The sodium aluminate filtrate was carbonated by carbon dioxide in the scrubbed gaseous product of a natural gas burner. The precipitated aluminum hydroxide was thickened, washed and calcined at a temperature of 1800° F. to produce the final high grade alumina, 75% of the alumina content of the original clay being recovered in this product. The thickener overflow and filter wash waters were collected for recovery of sodium carbonate. The sodium carbonate liquors were concentrated by evaporation to an $Na_2CO_3$ concentration of 212 g./l. and then recycled to the soda-sinter kiln feed.

The final high grade alumina product was substantially free of silica and iron, and admirably adapted as the feed to electrolytic reduction furnaces.

Various types of equipment may be used in carrying out the individual steps of the method, and apparatus herein specifically described or indicated on the flowsheets are illustrative and in no manner restrictive. The equipment in the aluminum chloride-ferric chloride and free hydrochloric acid circuits must be resistant to corrosive attack, and to this end presently-available rubber, plastic and ceramic types of materials-of-construction are adequate. Aside from pumps, the movements of liquid are relatively slow, and where necessary rubber-lined equipment is readily available therefor. The use of expensive special alloys is a minor item of equipment cost. Drying, calcining and sintering may advantageously be carried out in rotary kilns, although other types of kilns and furnaces may be used. Leaching is carried out at temperatures that do not require autoclaving and hence open tanks provided with mechanical agitation are entirely satisfactory. Digestion is carried out in autoclaves. Filtration is preferably (but not necessarily) carried out in vacuum type equipment, preceded where practical by thickening or clarification to reduce as far as possible the areas of filter surface required. Thickening may be carried out in wet cyclones, thickeners, clarifiers or the like.

Evaporation is preferably carried out in vacuum type evaporators.

I claim:

1. The method of producing substantially silica- and iron-free alumina from an iron-containing clay which comprises calcining the clay, dissolving aluminum and iron in the calcined clay by treatment with hydrochloric acid to form aluminum and iron chlorides, converting the aluminum and iron chlorides to aluminum and iron oxides by heat-treatment at a temperature within the range of 1000 and 1300° F., whereby an oxide product which is readily digestible in caustic soda solution is produced, digesting the resulting mixture of aluminum and iron oxides containing a minor amount not exceeding about 1% of residual chlorine in an aqueous caustic soda liquor under pressure and at a high temperature and thereby producing sodium aluminate with some sodium chloride in solution and an insoluble residue consisting principally of iron oxide, separating said insoluble residue from the solution of sodium aluminate and sodium chloride, treating said solution to precipitate aluminum hydroxide and thereby producing a spent caustic soda liquor containing some sodium chloride and suitable for digestion of additional aluminum and iron oxides as aforesaid, maintaining the concentration of sodium chloride in said spent caustic soda liquor below a predetermined maximum by removing any excess sodium chloride therefrom, and calcining said aluminum hydroxide precipitate to produce substantially silica- and iron-free alumina.

2. In the method of producing substantially silica-free and iron-free alumina from an iron-containing clay in which an iron-containing crude alumina substantially free of silica is first produced by calcining the clay, leaching the calcine with hydrochloric acid, separating the siliceous residue from the leach solution, and crystallizing aluminum and iron chlorides from the leach solution, the improvement which comprises subjecting said chloride crystals to calcination at a temperature within the range of 1000 and 1300° F. and thereby producing an iron-containing crude alumina substantially free of silica which is readily digestible in caustic soda solution, digesting said crude alumina in an aqueous caustic soda liquor under pressure and at high temperature and thereby dissolving the aluminum but not the iron, separating the iron residue from the aluminum-containing liquor, and recovering substantially silica-free and iron-free alumina from said aluminum-containing liquor.

3. The improvement according to claim 2, in which the silica-free and iron-free alumina is recovered from the aluminum-containing liquor by first precipitating aluminum hydroxide from the liquor and subsequently calcining the aluminum hydroxide at a temperature within the range of 1700 and 2100° F.

4. The improvement according to claim 3 in which the amount of iron in the clay does not exceed about 6% calculated as $Fe_2O_3$ and the spent caustic soda liquor resulting from the precipitation of aluminum hydroxide contains some sodium chloride which builds up as the spent liquor is recycled in digesting crude alumina, further characterized in that the concentration of sodium chloride in the recycled spent liquor is maintained below a predetermined maximum by removing excess sodium chloride therefrom.

References Cited in the file of this patent
UNITED STATES PATENTS

| | | |
|---|---|---|
| 1,341,901 | Hayward et al. | June 1, 1920 |
| 1,918,735 | Bradley | July 18, 1933 |
| 1,926,744 | James | Sept. 12, 1933 |
| 2,376,696 | Hixson | May 22, 1945 |
| 2,398,425 | Haff | Apr. 16, 1946 |
| 2,408,241 | Sturbelle | Sept. 24, 1946 |
| 2,440,378 | Newsome | Apr. 27, 1948 |
| 2,487,076 | Sharp et al. | Nov. 8, 1949 |